US012606073B2

(12) United States Patent
    Grushkowitz et al.

(10) Patent No.: US 12,606,073 B2
(45) Date of Patent: Apr. 21, 2026

(54) SOLAR TABLE MOBILE TRANSPORT VEHICLE WITH RACK

(71) Applicant: Terabase Energy, Inc., Berkeley, CA (US)

(72) Inventors: Tyler Grushkowitz, Corvallis, OR (US); Noah James Wakeman Bystrom, Corvallis, OR (US); Grant Joseph Kimzey, Placerville, CA (US); Adam Hansel, Davis, CA (US); Soren Jensen, Corte Madera, CA (US)

(73) Assignee: Terabase Energy, Inc., Berkeley, CA (US)

( * ) Notice: Subject to any disclaimer, the term of this patent is extended or adjusted under 35 U.S.C. 154(b) by 339 days.

(21) Appl. No.: 18/421,932

(22) Filed: Jan. 24, 2024

(65) Prior Publication Data

US 2025/0236230 A1      Jul. 24, 2025

(51) Int. Cl.
    *B60P 1/02*       (2006.01)
    *B60P 1/48*       (2006.01)
    *B60P 3/00*       (2006.01)
    *B60P 7/135*      (2006.01)

(52) U.S. Cl.
    CPC    *B60P 1/02* (2013.01); *B60P 1/48* (2013.01); *B60P 3/00* (2013.01); *B60P 7/135* (2013.01)

(58) Field of Classification Search
    CPC ........................................................ B60P 1/02
    See application file for complete search history.

(56) References Cited

U.S. PATENT DOCUMENTS

| | | |
|---|---|---|
| 2018/0370450 A1 | 12/2018 | Slocombe |
| 2023/0066547 A1 | 3/2023 | Campbell et al. |
| 2024/0367319 A1* | 11/2024 | Smith ...................... B66F 9/06 |
| 2024/0424971 A1 | 12/2024 | Hansel et al. |

FOREIGN PATENT DOCUMENTS

| | | |
|---|---|---|
| CN | 117301083 A | 12/2023 |

OTHER PUBLICATIONS

Arefeen, Shamsul, and Tim Dallas. "Low-cost racking for solar photovoltaic systems with renewable tensegrity structures." Solar Energy 224 (2021): 798-807. (Year: 2021).*
International Search Report and Written Opinion of the International Searching Authority mailed Mar. 19, 2025 in related PCT application No. PCT/US25/12818, (10 pgs).

* cited by examiner

*Primary Examiner* — Emmett K. Walsh
(74) *Attorney, Agent, or Firm* — Michael North

(57)                ABSTRACT

Embodiments of a solar table mobile transport vehicle capable of carrying multiple solar tables are described. Multiple solar tables may be vertically stacked on a rack. Each solar table may be supported by a pair of cantilevered beams such that the solar table may be unloaded from the rack in an unobstructed manner. The rack may be loaded on a mobile transport vehicle for transportation to a point of installation. Solar tables in the rack may be fetched by the mobile transport vehicle or another installation rover for installation. Such a capability of carrying multiple solar tables increases the installation efficiency of solar tables, especially for large solar farm constructions.

20 Claims, 16 Drawing Sheets

Park
Position

Transport
Position

SOLAR TABLE MOBILE TRANSPORT VEHICLE WITH RACK

TECHNICAL FIELD

The present disclosure relates generally to a solar table mobile transport vehicle. More particularly, the present disclosure relates to a solar table mobile transport vehicle capable of carrying multiple solar tables for improved transport efficiency.

BACKGROUND

The importance of solar power systems is well understood by one of skill in the art. Government agencies and companies are scaling the size and number of solar solutions within their energy infrastructure. This transition from traditional fossil fuel energy systems to solar energy solutions presents several challenges. One challenge is cost-effective management of the construction process and the ability to efficiently move components around the site during the construction process.

Large-scale solar systems typically include thousands of solar panels that are located across a multi-acre terrain and that are electrically coupled to provide a source of energy. These large-scale systems are oftentimes located in remote areas and require a significant investment in materials, resources, and labor in their installation and design. The sourcing and delivery of materials and resources for these installations can be problematic and inconsistent. A further complication is the reliable and safe movement of these materials and resources across large areas of the construction site as well as maintaining consistent installation processes at each point of installation within the site. These issues further contribute to an increase in the cost and complexity of what is already a very cost-sensitive process.

FIG. 1 illustrates a typical prior-art installation process for solar systems. This prior-art installation process is implemented such that all mounting equipment for each solar panel is individually assembled and installed at its location within the larger system. The cost-effectiveness of this approach works fine within smaller solar deployments but struggles to cost-effectively scale to large solar systems as described below.

This traditional deployment 101 relies on materials delivered to a deployment site via an access road. The materials are then processed and staged at the deployment site by a crew. A small portion of this delivered material is then moved by heavy equipment to a specific location where a solar panel and mounting equipment are assembled and installed at that location 102. The step is repeated for an adjacent location 103 where materials are subsequently delivered, assembled, and installed for a neighboring solar table within the system. While this approach may be effectively deployed in the installation of smaller solar systems, it becomes cost-prohibitive as the size of the system increases.

What is needed are systems, devices, and methods that reduce the complexity and cost of the installation of large-scale solar panel systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

DETAILED DESCRIPTION OF EMBODIMENTS

Figure 1:
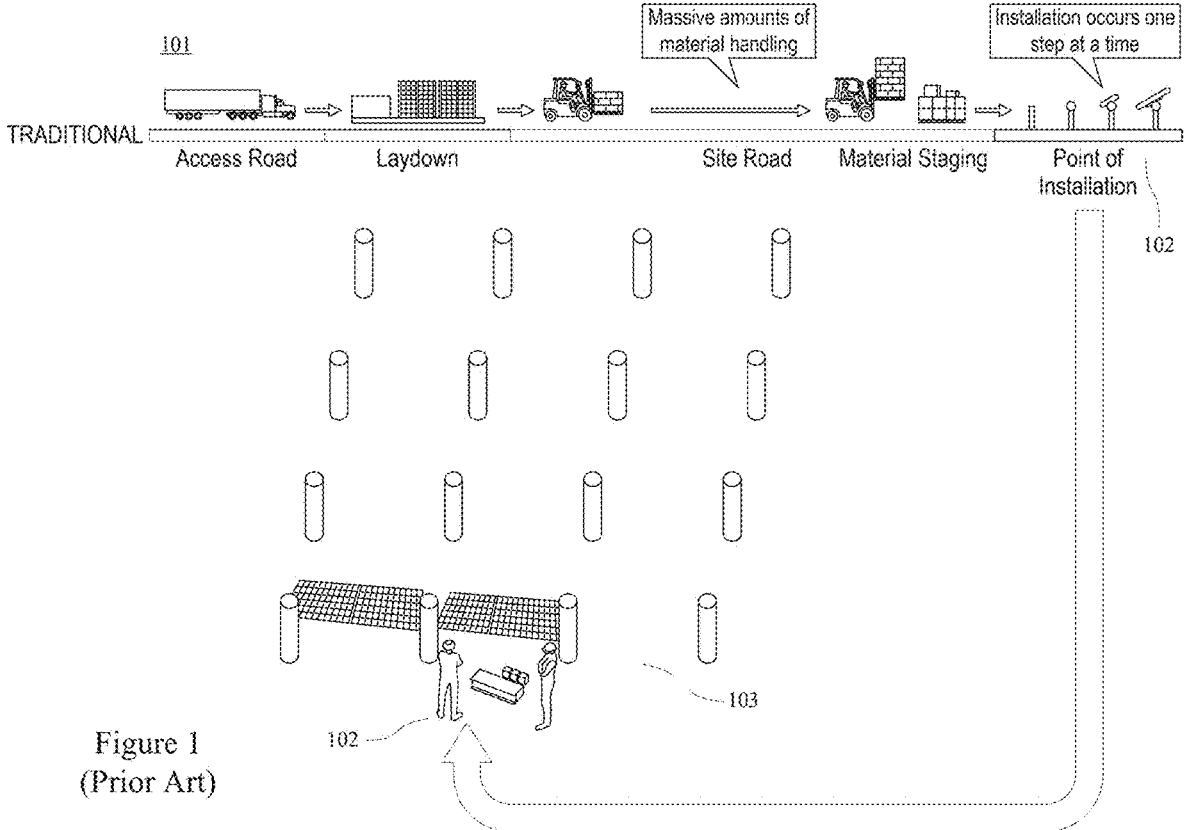
FIG. 1 shows a prior art assembly and installation process of large-scale solar panel systems.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method.

Components, or features, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of mechanical structures supporting corresponding functionalities of the solar table mobile transport.

Furthermore, connectivity between components or systems within the figures are not intended to be limited to direct connections. Also, components may be integrated together or be discrete prior to construction of a solar panel mobile transport.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functions may be optional; (2) components or functions may not be limited to the specific description set forth herein; (3) certain components or functions may be assembled/combined differently across different solar table mobile transports; and (4) certain functions may be performed concurrently or in sequence.

Furthermore, it shall be noted that many embodiments described herein are given in the context of the assembly and installation of large numbers of solar tables within a system, but one skilled in the art shall recognize that the teachings of the present disclosure may apply to other large and complex construction sites in which resources and personnel are difficult to manage and accurately predict. Additionally, embodiments of a solar table mobile transport may be implemented in smaller construction sites.

In this document, "large-scale solar system" refers to a solar system having 1000 or more solar panels. The word "resources" refers to material, parts, components, equipment or any other items used to construct a solar table and/or solar system. The word "personnel" refers to any laborer, worker, designer, or individual employed to construct or install a solar table or solar system. The term "solar table" refers to a structural assembly comprising a torque tube and/or purlins with module rails. Some types of solar tables may have supplemental structure that allows it to connect to foundations/piles while other types do not have this supplemental structure. A solar table may have (but is not required) one or more solar panels and/or electrical harnesses. The term "solar table mobile transport" (hereinafter, "mobile transport") describes a vehicle used to move a solar table to an installation site and facilitate the installation process of the solar table. A mobile transport may be driven by personnel, controlled by remote control or move autonomously within at least a portion of a solar system construction site. The term "transport component" refers to a lower portion of the mobile transport that provides movement and includes wheels (or similar features such as a tractor assembly or robotic system), steering mechanism (autonomous or personnel driven) and braking mechanism.

In this document, the term "rack" is a structure to securely hold multiple preassembled solar tables. The rack may be loaded on a mobile vehicle to transport multiple solar tables at once. The rack may or may not provide alignment capability for desired vertical, horizontal, and/or angular motions for a torque tube and/or solar table. The movement may be a manual or motorized motion. The term "motor" is defined as a structural device that produces motion, unidirectional or multidirectional, of a solar table. Examples of some motors may include elements such as actuators, tracks, etc. that help in producing motion of structures within the mobile transport or the solar table. Other than alignment features, the rack may have movement capabilities to aid in loading and unloading of a table such as the drawer slides. Motors/actuators may be powered off a solar panel/battery attached to the rack or via temporary power take off from the vehicle.

Figure 2:
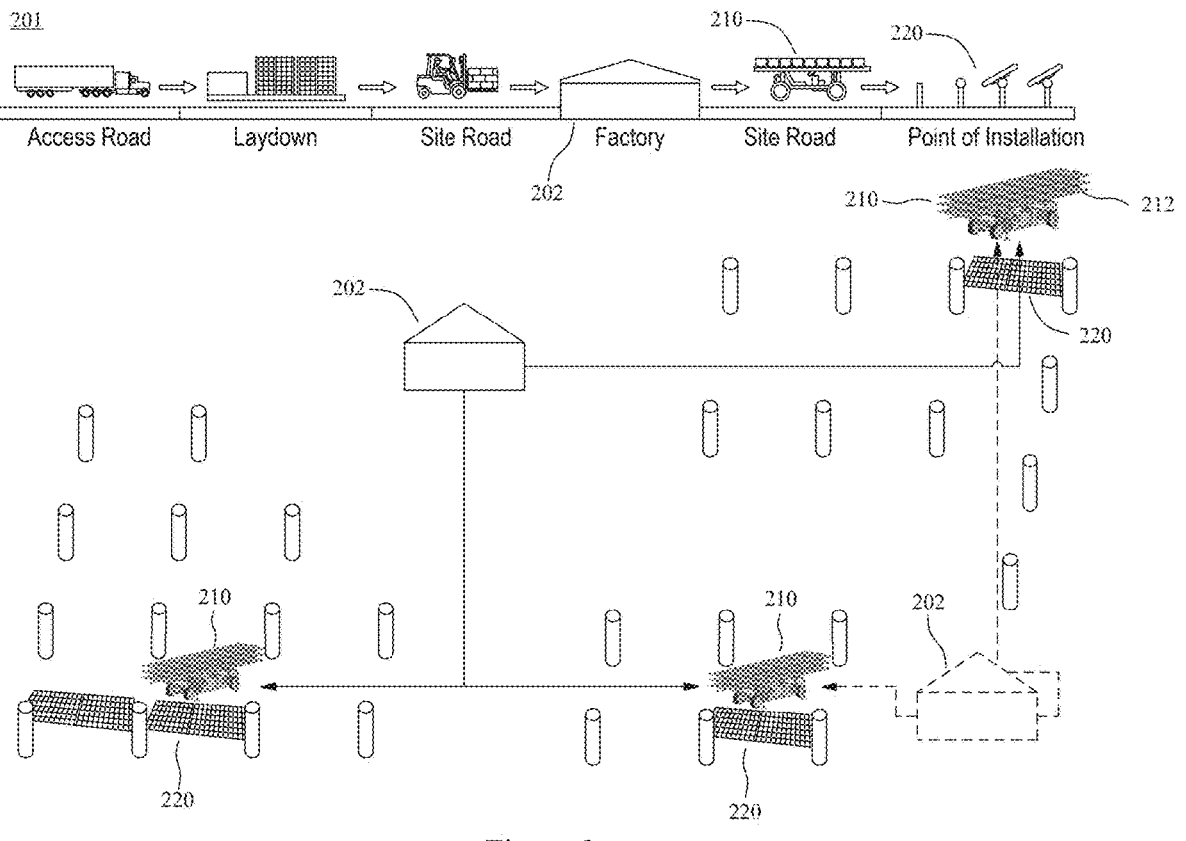
FIG. 2 is a diagram showing a centralized assembly and installation of a solar system using mobile transport of solar tables according to various embodiments of the invention.

FIG. 2 provides an overview of a centralized solar table assembly and installation for large-scale solar systems according to various embodiments of the invention. Embodiments of the invention transition the prior art approach of assembly and installation at single location sites to a centralized and coordinated assembly factory that allows a more cost-effective and dynamic process of constructing large-scale solar systems. This centralized assembly of solar system components, such as solar tables, necessitates a more robust transport vehicle to move the preassembled components to the installation site. Additionally, installation of these preassembled components may require functionality to support the alignment and integration of these components into the system. This alignment of a solar table secured on a mobile transport to a particular installation site is aided by horizontal and/or vertical motion via one or more collapsible manipulators.

Resources are brought to construction site 201 for a large-scale solar system and initially processed. These resources are delivered to one or more assembly factories 202 where a coordinated and centralized solar table assembly process is performed. In certain embodiments, a construction site may have multiple centralized factories 202. As shown in FIG. 2, there are two centralized factories 202 strategically located at the site. The location and number of centralized factories 202 may depend on several parameters including the size of the site, the terrain of the site, the design of the site and other variables that relate to the construction of the large-scale solar system.

Assembled solar tables and equipment are moved from factory 202 to a point of installation 220 via motorized vehicles such as a mobile transport 210 (also referred to as a mobile transport vehicle or MTV), which is specifically designed to transport multiple solar tables along a site road to one or more points of installation 220. The mobile transport 210 may be driven by personnel, may be controlled by remote control or autonomously driven by a computer system. The time and/or sequence in which solar tables are delivered to points of installation 220 may depend on a variety of factors that may be analyzed to configure a preferred schedule. By enabling the mobile transport 210 to carry multiple solar tables 212 from the central assembly factory 202 to one or more points of installation, transport efficiency and thus overall installation efficiency may be improved significantly, especially for a large solar farm installation site where the transportation distance between the central assembly factory and points of installation may be excessive.

In embodiments, delivery of assembled solar tables to an installation site may require an alignment process to installation points at the installation site. Because an assembled solar table is oftentimes large and heavy, this alignment process may be difficult and require significant effort by personnel to properly align both ends of a solar table to receptors, piles, or other coupling elements at the installation site. Embodiments of the solar table mobile transport may allow manual or motorized vertical/horizontal alignment of the solar table while it is still secured to the mobile transport. Specifically, the horizontal alignment capability also allows less precise positioning of the mobile transport at the installation site due to the horizontal movement capability of the solar table. As a result, the mobile transport may be parked proximate to the installation site without requiring precise parking to initiate an alignment and installation process.

Alternatively, the solar table mobile transport 210 may drop the carried solar tables at the point of installation or transfer the solar tables to a lander vehicle deployed at the installation side for handling installation only. The mobile transport 210 and the lander vehicle may share the same basic vehicle structure but with different supporting structures for different service functions.

Figure 3:
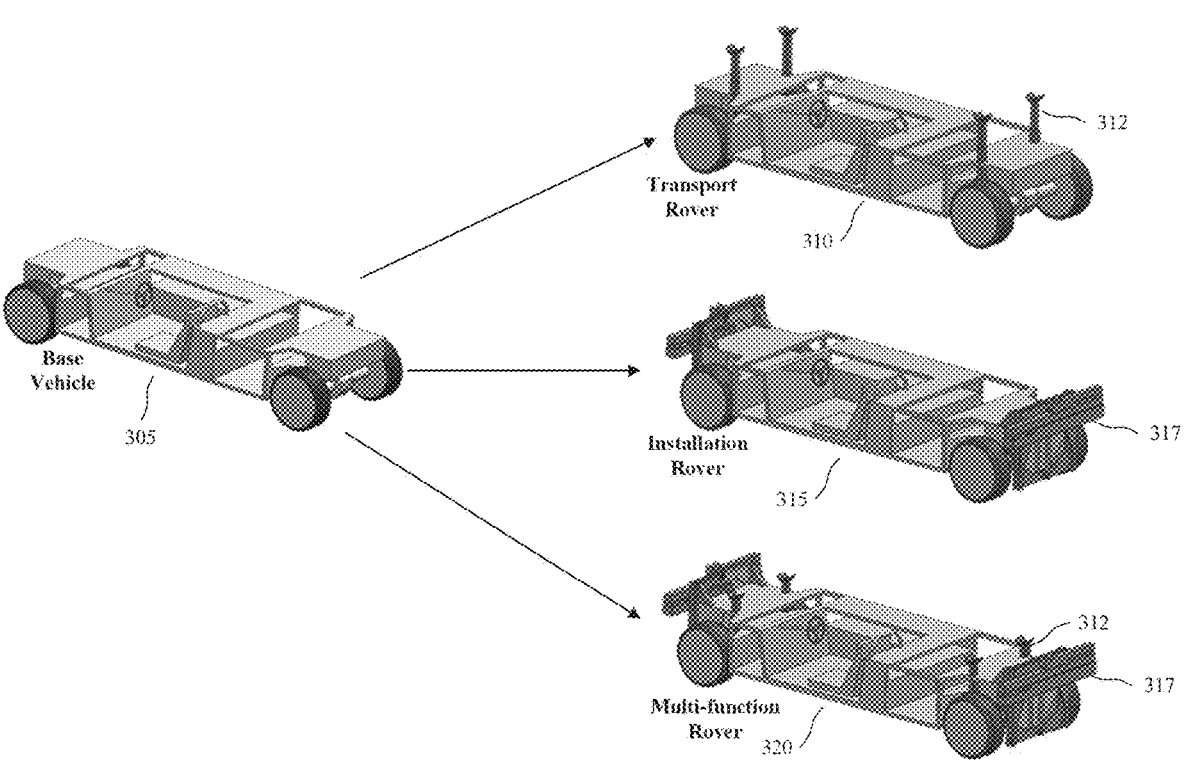
FIG. 3 is an architectural overview of different types of mobile vehicles to facilitate solar table installation according to various embodiments of the present invention.

FIG. 3 is an architectural overview of different types of mobile vehicles to facilitate solar table installation according to various embodiments of the present invention. The vehicles may all be based on a base vehicle 305, but with different add-on structures to serve different roles to facilitate solar table installation. The base vehicle 305 comprises a vehicular segment that can move throughout a solar system construction site under the control of a driving system. Examples of the vehicular segment include a wheel system, tractor system and/or robotic movement system to move a solar table from a factory to an installation point. The base vehicle 305 comprises a driving system for movement control. Examples of a driving system include systems that are controlled by an in-vehicle driver, a remote control being used by personnel or an autonomous driving system. If an autonomous driving system is employed, the base vehicle 305 comprises autonomous driving capabilities, which include both a vehicle location element (such as a GPS location, autonomous sensor and image processing, and/or virtual construction site map including roads between factories and installation sites).

The base vehicle 305 may be modified and/or supplemented with a variety of structural and functional elements to further assist in the transportation of solar tables within a solar system construction site. For example, a transport rover 310 may be configured by attaching a set of holding arms 312 to the base vehicle to serve as a solar table carrier only. The set of holding arms 312 is extendable and is configured to support a rack such that the transport rover 310 may transport multiple solar tables at once. An installation rover 315 may be configured by attaching a set of solar table alignment and support (STAS) components 317 to the base vehicle to serve as a solar table installation vehicle only. The STAS components 317 provide horizontal, vertical and/or angular motion to facilitate the installation of a solar table. A multi-function rover 320 may be configured by attaching both a set of holding arms 312 and a set of STAS components 317 to the base vehicle to serve as a solar table carrier and a solar table installation vehicle.

Figure 4:
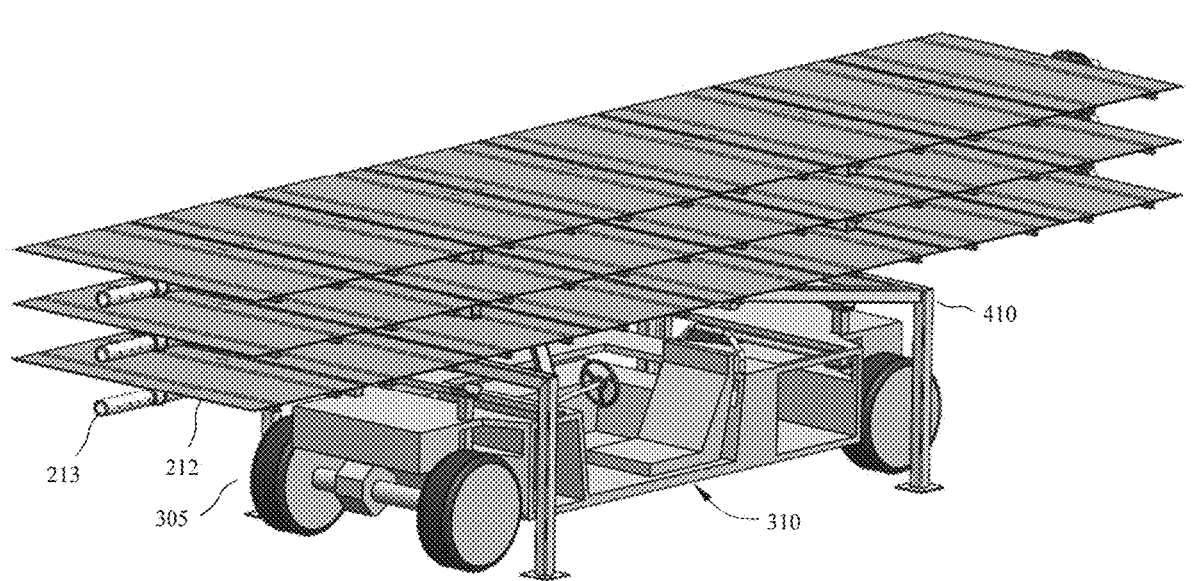
FIG. 4 is a perspective view of a transport rover with a rack to transport multiple solar tables according to various embodiments of the present invention.

FIG. 4 is a perspective view of a transport rover with a rack to transport multiple solar tables according to various embodiments of the present invention. The rack 410 holds multiple solar tables 212 preassembled at central assembly factory 202 and stacked on the rack. With the capacity to carry multiple solar tables at once, the transport rover significantly increases the transport efficiency and overall installation efficiency.

Figure 5:
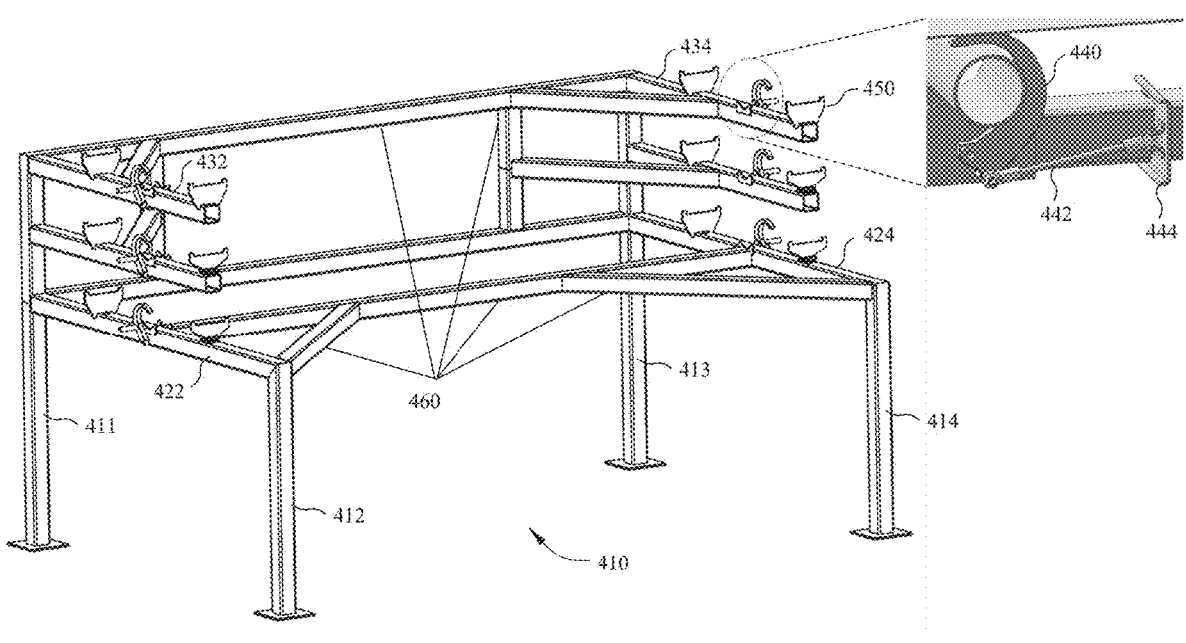
FIG. 5 is a perspective view of a rack capable of holding multiple solar tables according to various embodiments of the present invention.
Figure 6:
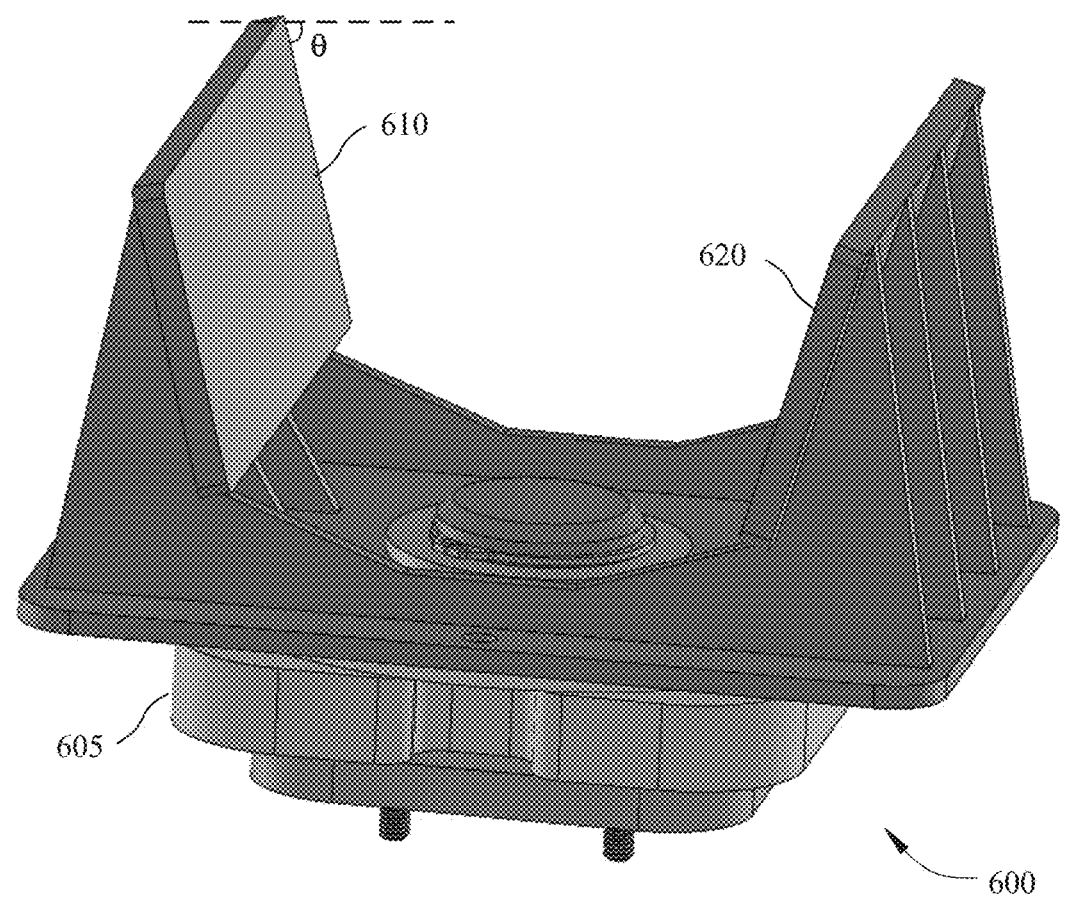
FIG. 6 is a perspective view of a wedge clamp using only gravity to hold a solar tube according to various embodiments of the present invention.

FIG. 5 is a perspective view of a rack capable of holding multiple solar tables according to various embodiments of the present invention. The rack 410 comprises a plurality of rack legs 411-414, a pair of support beams 422/424, and one or more pairs of cantilevered beams, e.g., 432/434. The rack legs enable the rack to stand by itself and allow a transport rover (or a multi-function rover) to be parked underneath the pair of support beams, as shown in FIG. 6. The pair of support beams 422/424 may also be configured to support one solar table. The one or more pairs of cantilevered beams are stacked vertically with each pair designated to support one solar table. The cantilever layout ensures that solar tables may be loaded or unloaded in an unobstructed manner from an open side. The rack 410 may further comprise one or more reinforcement beams 460 for structural reinforcement to the support beams and the cantilevered beams.

In one or more embodiments, a tube hook 440 may be displaced on each support beam and each cantilevered beam. The tube hook is rotatable to engage a torque tube of a solar table and functions in collaboration with anti-rotational wings 450 placed on both sides of the tube hook to provide stable and secure support for the solar table during transportation. The tube hook 440 may be actuated by a locking knob 444 through a control link 442 to securely lock the torque tube in place. The anti-rotation wing 450 at the end of the cantilever beam may be a passive double acting spring hinge to allow for the passage of the tube but still maintain as a support to rotation or an actuated feature powered via solar panel/battery or with power take off from a vehicle. The hook 440 may be passively engaged by the control link 442 and the locking knob 444, which may be set at the central assembly factory and reset by an STAS of a mobile transport. Alternatively, the hook 440 may be actuated by an electric motor powered by a mobile transport or solar panels/battery/generator placed on the rack.

Although FIG. 5 shows a hook to securely support a torque tube, one skilled in the art shall understand that various other means, e.g., a C-clamp or a wedge clamp, for secure tube supporting. For example, a C-clamp comprising a pair of cradle surfaces may be used to support a torque tube. The C-clamp may be tightened or compressed such that the pair of cradle surfaces firmly hold the torque tube in place. The friction force between the cradle surfaces and the torque tube may effectively prevent the torque tube from rotating during transportation. The C-clamp may be used alone or in collaboration with the anti-rotation wings.

In another example, a wedge clamp may be used to securely hold a torque tube using only gravity. FIG. 6 is a perspective view of such a wedge clamp according to various embodiments of the present invention. The wedge clamp 600 comprises a clamp base 605 for attaching the wedge clamp to a cantilevered beam or a support beam, a first clamp surface 610, and a second clamp surface 620. The first clamp surface 610 and the second clamp surface 620 form a high angle cradle to receive a torque tube. When the torque tube is laid down between the first and second clamp surfaces, the gravity of the torque tube (and also the solar panels attached to the torque tube) drags the torque tube downward. The high angle cradle is a very effective to amplify the gravity force with an amplification factor to a normal force to securely hold the torque tube and to prevent tube rotation. Dependent on the geometry, the amplification factor may be related to the tangent of the vertical angle θ of the clamp surfaces. For example, the amplification factor may be 2.75 (tan 70°) at a 70° vertical angle, 11.4 (tan 80°) at a 80° vertical angle, or even go to infinity as the angle θ approaches 90°. Such gravity force amplification may be effective and adequate to securely hold the torque tube in place during transportation without involving extra anti-rotation rings.

Figure 7:
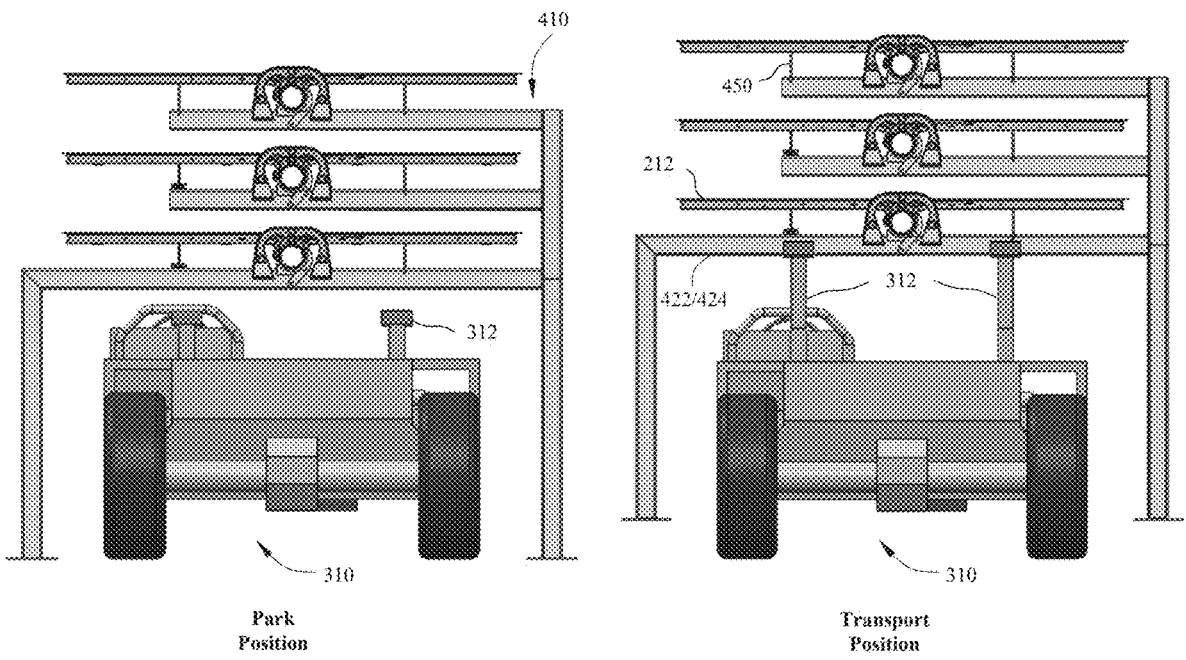
FIG. 7 is a front view of a transport rover with a rack in a parking position and a transport position according to various embodiments of the invention.

FIG. 7 is a front view of a transport rover 310 with a rack in a parking position and a transport position according to various embodiments of the invention. In the parking position, the rack stands by itself with support from the rack legs. A mobile transport, e.g., the installation rover 315, parks parked underneath the pair of support beams 422/424. In the transport position, the holding arms 312 are extended to engage the support beams 422/424 and lift the rack 410 off the ground for transportation.

Figure 8:
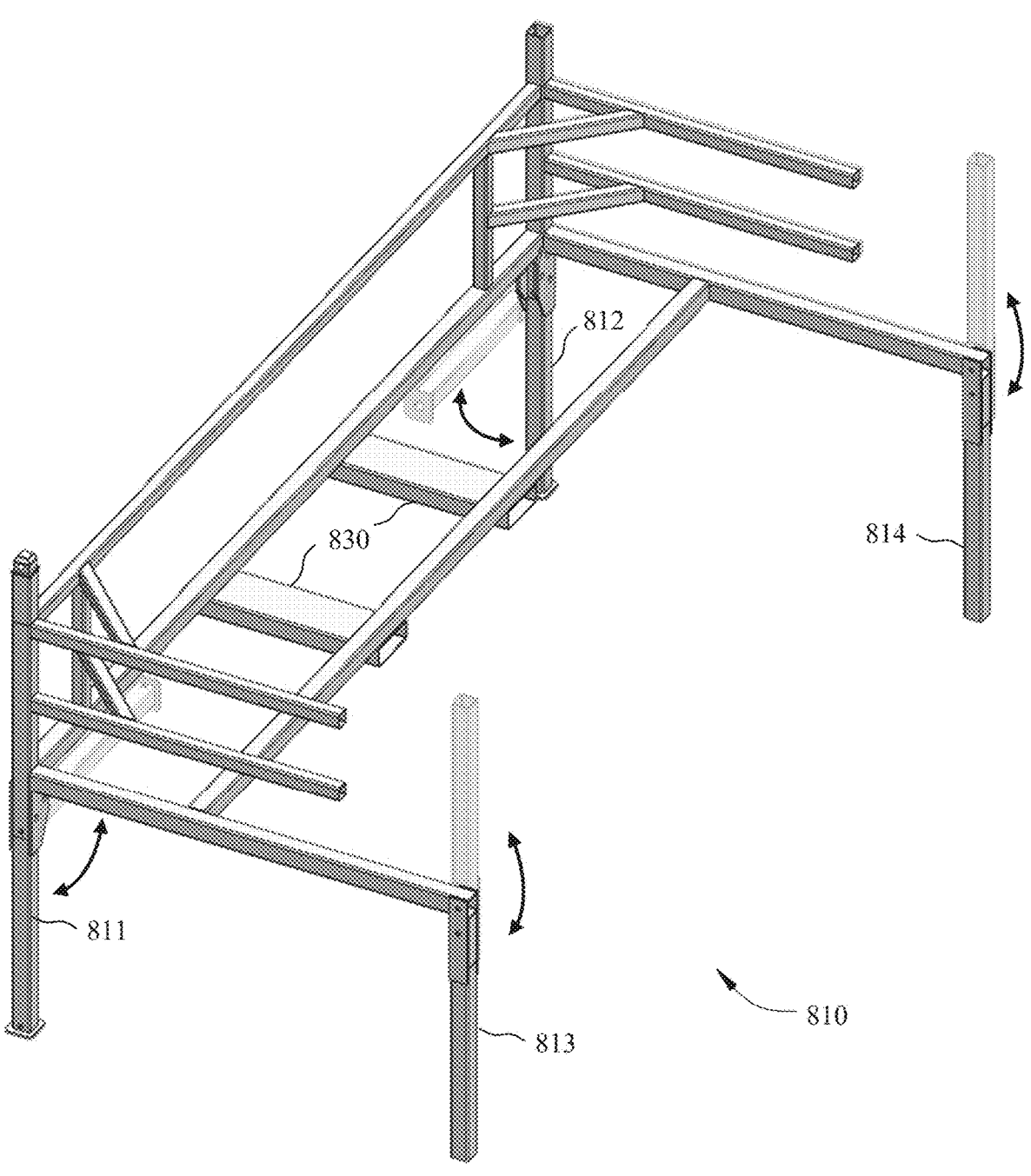
FIG. 8 is a perspective view of another rack to hold multiple solar tables according to various embodiments of the present invention.

FIG. 8 is a perspective view of another rack to hold multiple solar tables according to various embodiments of the present invention. The rack 810 has a structure mostly similar to the rack 410, such as support beams, stacked cantilevered beams, and reinforcement beams, tube hooks and anti-rotational wings (not shown in FIG. 8), etc. The rack 810 may also comprise a pair of forklift receiving sleeves 830 for receiving forks from a forklift such that the rack 810 may be lifted and placed on top of a solar panel mobile transport vehicle.

Figure 9:
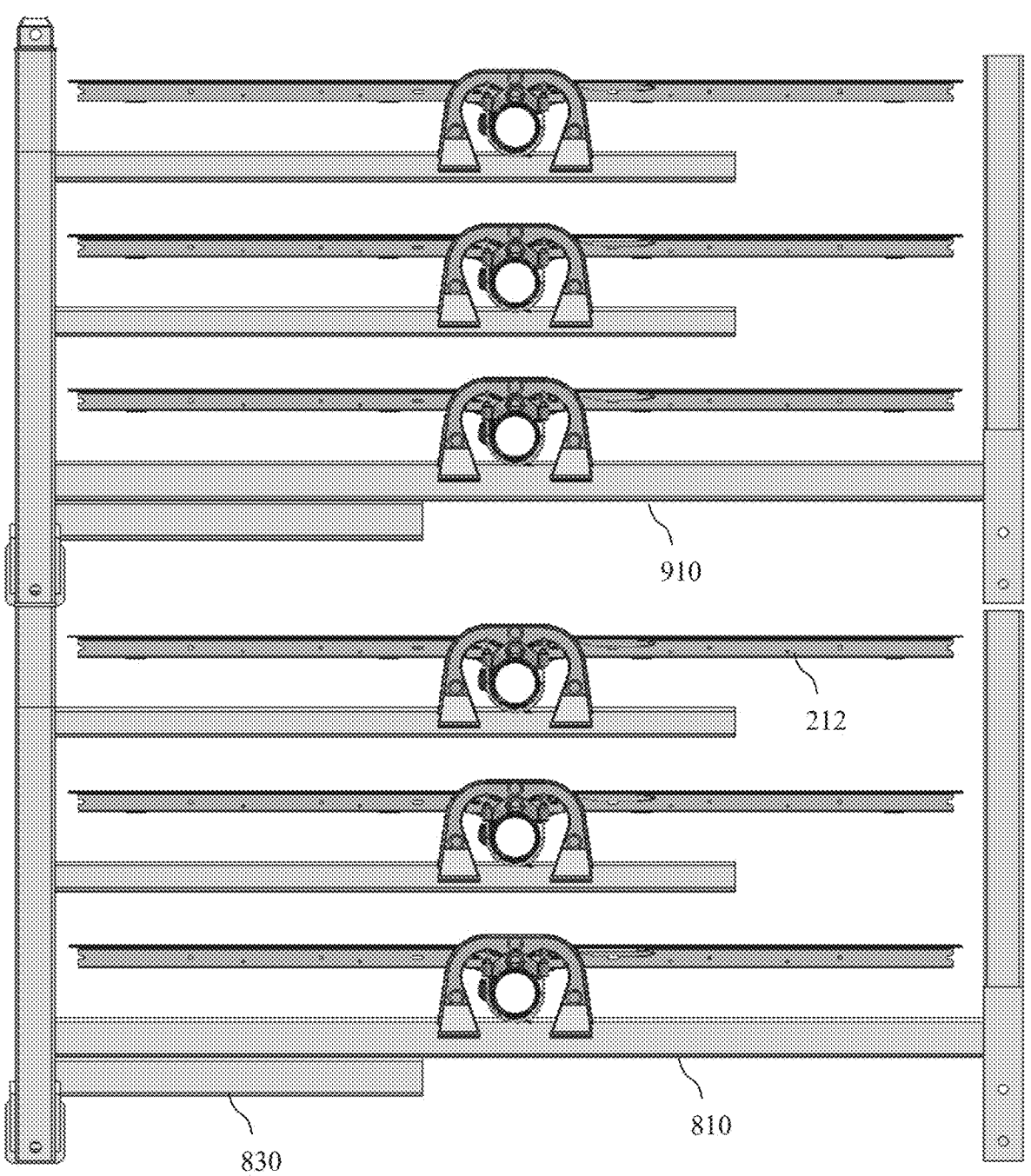
FIG. 9 is a side view of stacked racks with multiple solar tables according to various embodiments of the present invention.

Different from the rack 410, the rack legs 811-814 of the rack 810 are foldable. As shown in FIG. 8, the rack legs 811 and 812 may be folded sideward, while the rack legs 813 and 814 may be folded upward. Such a folding layout ensures that the rack 810, with the rack legs folded, may be stacked vertically above another rack 910, as shown in FIG. 9. The stacked racks may act as a buffer to separate material stream from the central assembly factory to on-site solar table installation and to make assembling and installation processes less dependent on just-in-time deliveries. Therefore, the overall solar farm construction process may be both robust and flexible.

Once arriving the point of installation, the transport rover 310 may unload the rack to the ground and move back to the assembly factory for transporting another rack. An installation rover 315 deployed at the point of installation may fetch a solar table once a time from the rack for installation. Alternatively, the transport rover 310 may still carry the rack after arriving at the point of installation. The installation rover may fetch a solar table directly from the transport rover for installation.

Figure 10:
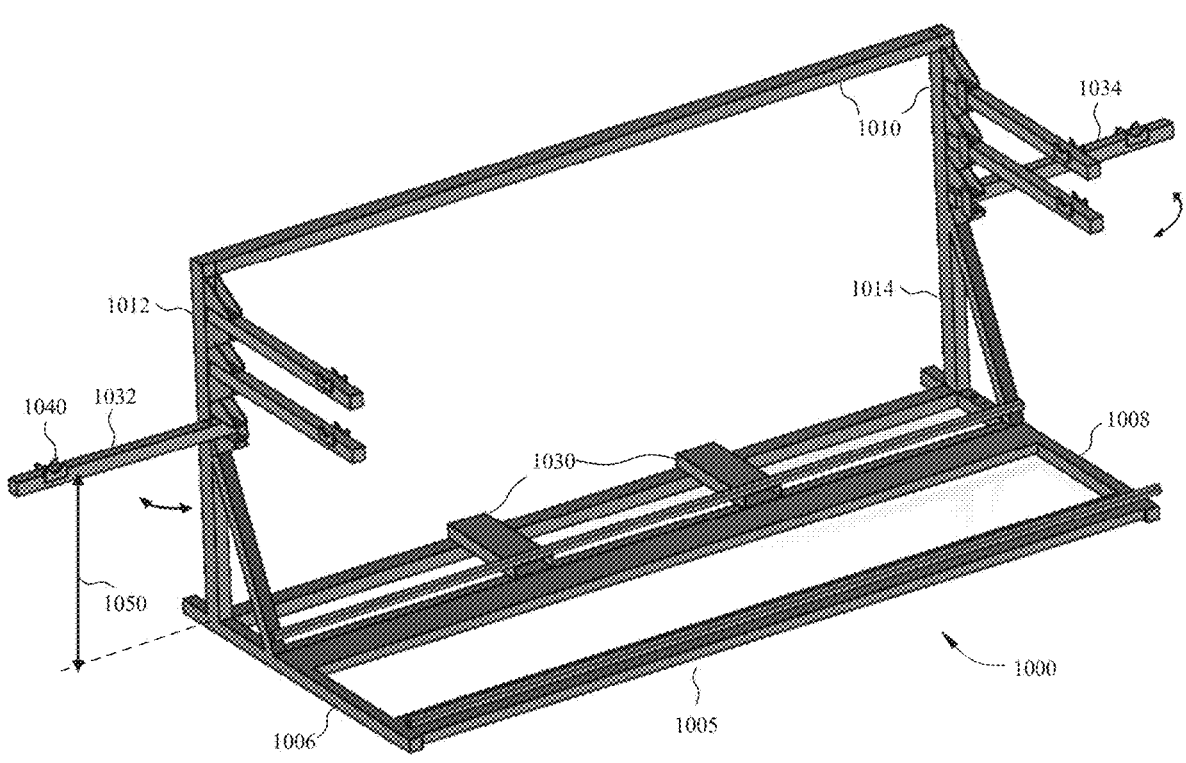
FIG. 10 is a perspective view of a rack with swingable arms to hold multiple solar tables according to various embodiments of the present invention.

FIG. 10 is a perspective view of a rack with swingable beams to hold multiple solar tables according to various embodiments of the present invention. The rack 1000 comprises a base frame 1005 that has a pair of support beams 1006/1008, and a vertical frame 1010 that has a pair of vertical beams 1012/1014. One or more pairs of swingable beams, e.g., 1032/1034, are attached to the vertical beams 1012/1014 with each pair of swingable beams configured to support one solar table. The rack 1000 may also comprise a pair of forklift receiving sleeves 1030 attached to the base frame 1005 for receiving forks from a forklift such that the rack 1000 may be lifted with the support beams 1006/1008 placed on top of a mobile transport vehicle for transportation to a desired installation place. Once arrived at the desired installation place, the rack 1000 may be unloaded by another forklift deployed on the installation place to ground.

A tube receptacle 1040 is displaced on each swingable beam. The tube receptacle 1040 may be a concaved plate or a tube hook to engage a torque tube of a solar table and functions in collaboration with anti-rotational wings (not shown in FIG. 10) placed on both sides of the tube receptacle to provide stable and secure support for the solar table during transportation.

Figure 11:
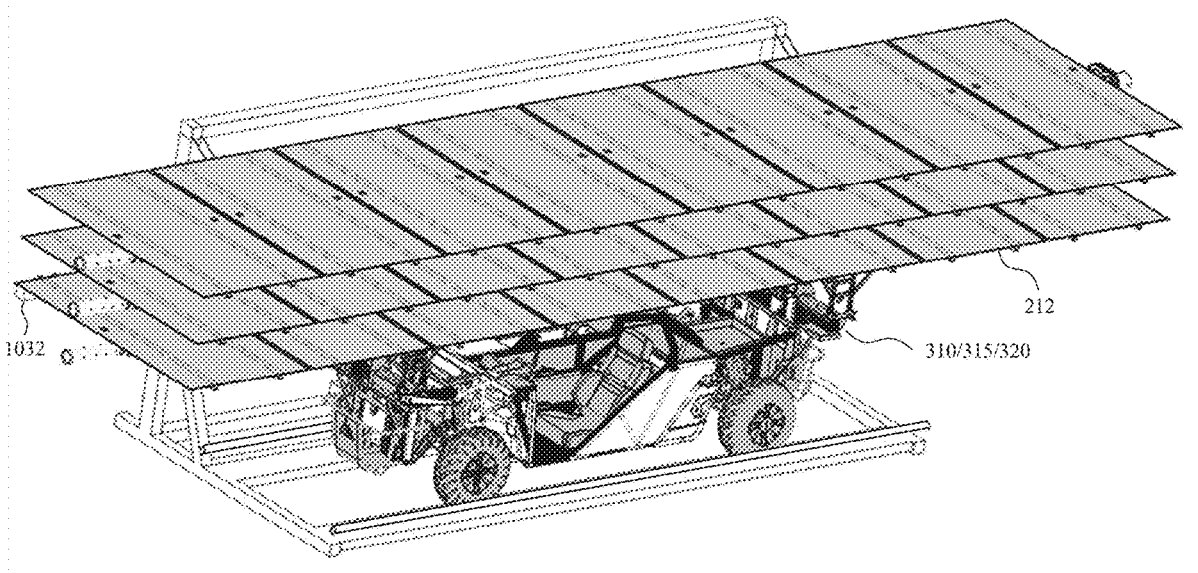
FIG. 11 is a perspective view of a mobile vehicle parking underneath the rack with swingable arms to fetch a solar table according to various embodiments of the present invention.

The one or more pairs of swingable beams are stacked vertically with each pair designated to support one solar table. The swingable beams are cantilevered beams that can be swung sideward. The swingable beams have a minimum vertical distance 1050, defined as the vertical distance between the lowest swingable beam and the base frame 1005 (and thus the support beams 1006/1008), above the height of the mobile transport vehicle. Such swingable configuration and minimum vertical distance setup allow a mobile vehicle, even a mobile vehicle without sideshift capability, to pick up a solar table from the rack directly underneath the solar table. FIG. 11 is a perspective view of a mobile vehicle parking underneath the rack with swingable arms to fetch a solar table according to various embodiments of the present invention. The mobile transport vehicle 310/315/320 parks underneath the solar table 212, lifts the table slightly such that the pair of swingable beams 1032/1034 may be swung sideway, lowers the solar table 212 down to a transport position, and drives out of the rack with the the solar table 212. In this embodiment, the mobile transport vehicle does not need to have a sideshift element or does not have to involve a sideshift element to fetch the solar table laterally and hold the solar table until it is clear of the cantilevered arm to be lowered to the transport position.

Figure 12:
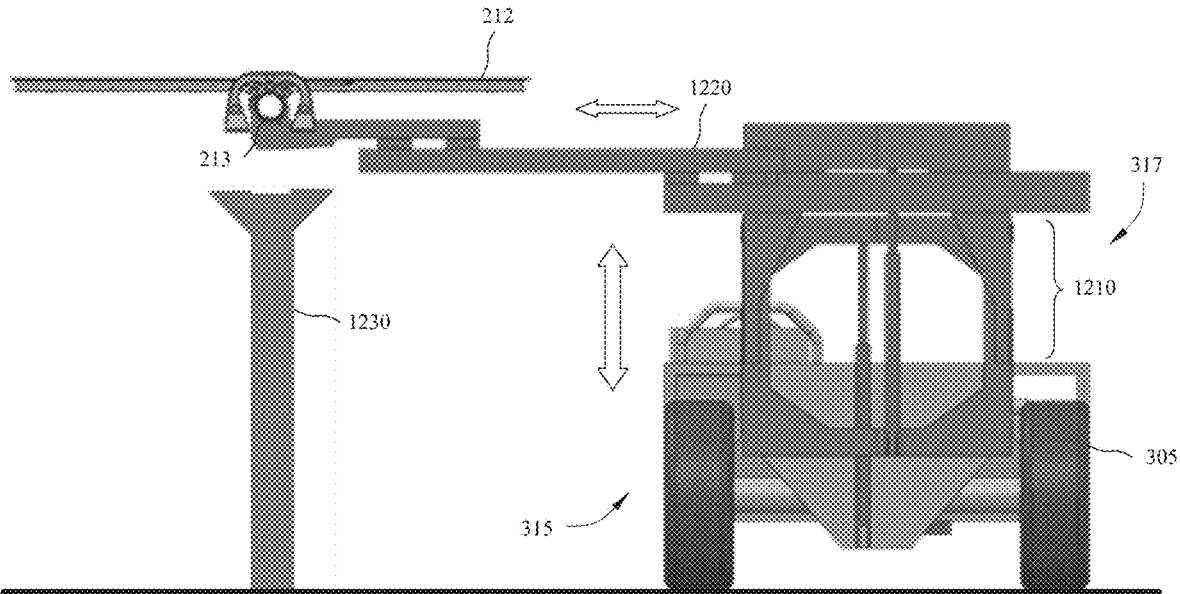
FIG. 12 is a front view of an installation rover to install a solar table according to various embodiments of the invention.

FIG. 12 is a front view of an installation rover to install a solar table according to various embodiments of the invention. The installation rover 315 comprises the base vehicle 305 that provides movement to the mobile transport. The installation rover 315 also comprises a pair of STAS components 317 (only one STAS component shown in FIG. 10, and the other STAS component is positioned behind). Each STAS component comprises a vertical motion element 1210 enabling vertical motion, and a sideshift element 1220 enabling horizontal motion of a solar table. The sideshift element 1220 is coupled to a solar tube 213 of the solar table 212. The sideshift element 1220 may be a rail with a motorized track that moves the solar table 212 along a horizontal plane. One skilled in the art will recognize that the sideshift element may be realized in various structures and motorized or manually controlled by personnel.

As shown in FIG. 12, the installation rover 315 is parked proximate to a pile 1230 to which the solar table 212 is to be aligned and secured. The sideshift capability of the installation rover 315 allows it to be parked proximate to these piles instead of between the piles. In particular, the sideshift element 1220 provides extended horizontal movement of the solar table 212 to facilitate alignment without the installation rover 315 being positioned between the piles. The STAS components 317 may facilitate horizontal, vertical, and angular control to assist solar table installation.

In one or more embodiments, multiple racks may be assembled and stacked at a centralized factory and loaded onto a trailer, which is then moved to a desired installation field by a transportation vehicle, e.g., a tractor. The stacked racks are unstacked and placed on the ground. The installation rover 315 may fetch one solar table from the unstacked racks for installation.

Figure 13:
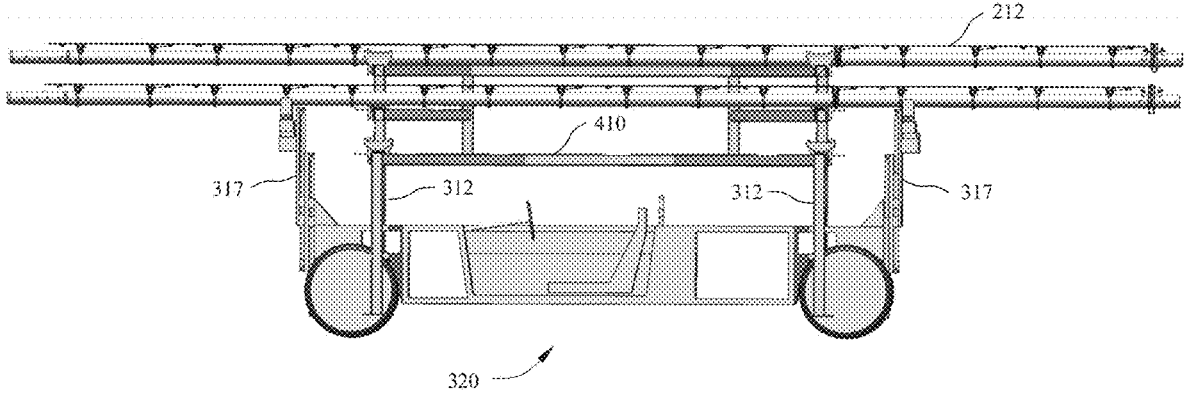
FIG. 13 is a side view of a multi-function rover carrying multiple solar tables according to various embodiments of the present invention.
Figure 14:
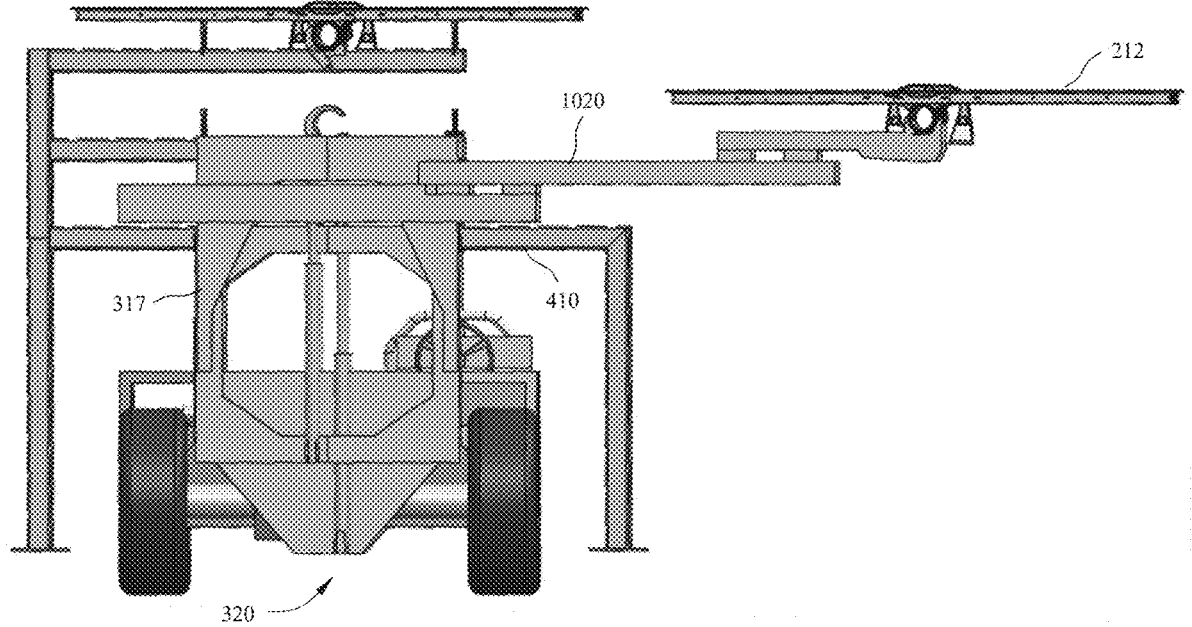
FIG. 14 is a front view of a multi-function rover to install a solar table according to various embodiments of the invention.
Figure 15:
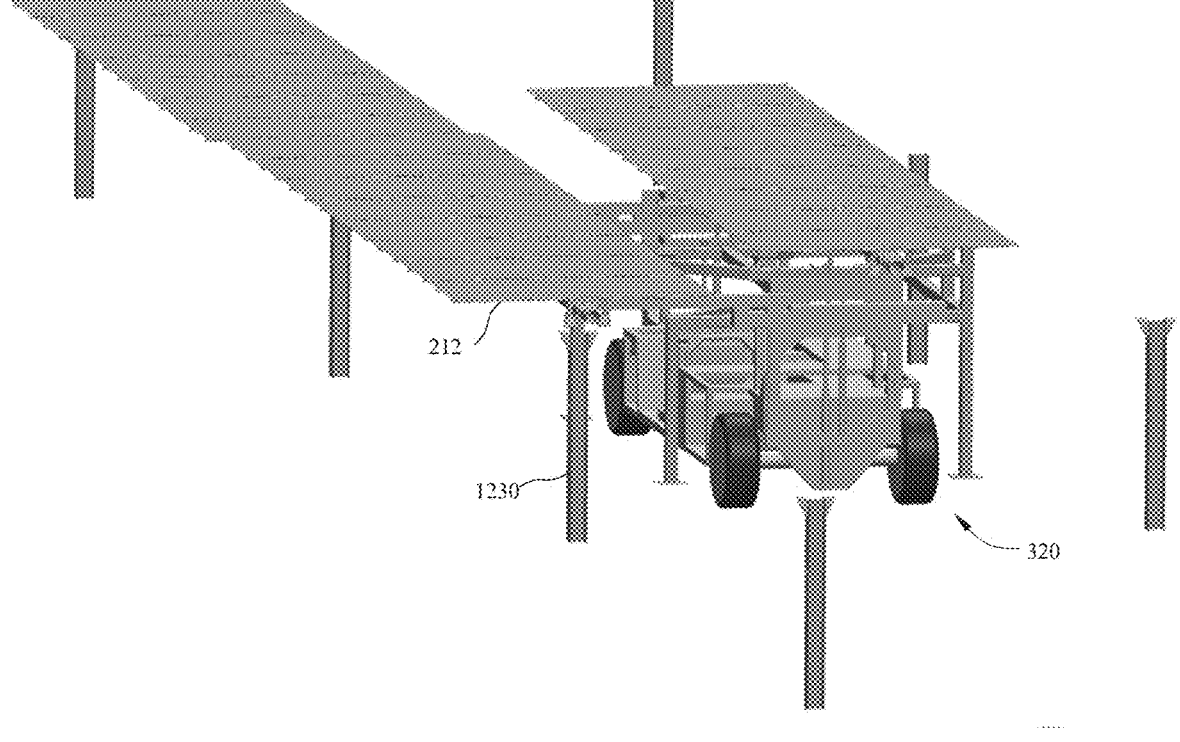
FIG. 15 is a perspective view of a multi-function rover to install a solar table according to various embodiments of the invention.

As previously mentioned, a multi-function rover 320 may be configured by attaching both a set of holding arms 312 and a set of STAS components 317 to the base vehicle to serve as a solar table carrier and a solar table installation vehicle. FIG. 13, FIG. 14, and FIG. 15 depict a side view, a front view, and a perspective view of such a multi-function rover 320 carrying multiple solar tables for installation according to various embodiments of the present invention. The multi-function rover 320 comprises a set of holding arms 312 and a pair of STAS components 317 placed on both ends of the multi-function rover 320. The set of holding arms 312 are placed in an inner section of the multi-function rover 320. Considering the space requirement to support vertical and sideshift movement, the STAS components are preferably placed on both ends for such space accommodation.

In one or more embodiments, when the multi-function rover 320 transports the rack, only the holding arms 312 engages the rack to avoid excessive mechanical stress on the STAS components since the STAS components 317 are designated to handle one solar table at a time. Once the multi-function rover 320 arrives at a point of installation, the multi-function rover 320 may lower the holding arms 312 first to stably put the rack on ground first. Afterwards, the STAS components 317 start to engage a solar table on the bottom of the solar table stack and move the solar table via sideshift, vertical motion, or combination thereof, for installation.

Figure 16:
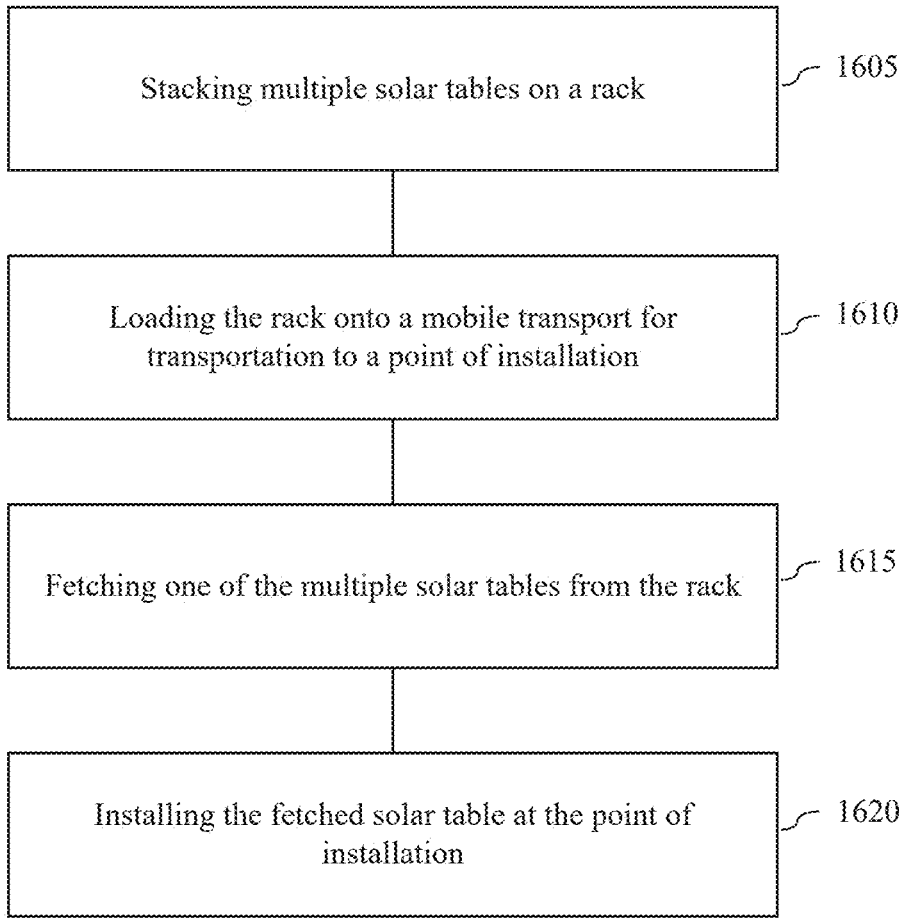
FIG. 16 is a process diagram of transporting multiple solar tables for installation according to various embodiments of the invention.

FIG. 16 is a process diagram of transporting multiple solar tables for installation according to various embodiments of the invention. In step 1605, multiple solar tables are stacked vertically on a rack. Each solar table may be supported by a pair of cantilevered beams such that the solar table may be unloaded in an unobstructed manner from an open side.

In step 1610, a mobile transport, e.g., an installation rover 315 or a multiple-function rover 320, loads the rack for transportation to a point of installation. The rack may be loaded onto the mobile transport as described in FIG. 7 or by a forklift as described earlier.

In step 1615, one of the multiple solar tables is fetched from the rack. The one solar table may be fetched by a second mobile transport (e.g., an installation rover) from the rack after the rack is unloaded to the ground from the mobile transport or directly from the mobile transport vehicle. Alternatively, the one solar table may be fetched by the mobile transport itself (when the mobile transport is a multiple-function rover) using STAS components in the mobile transport.

In step 1620, the fetched solar table is installed at the point of installation. The installation may be implemented by the mobile transport itself or by the second mobile transport.

One skilled in the art will recognize that the different movements supported by the mobile transport support robust alignment processes that allow for a more efficient and accurate alignment of a solar table to a corresponding mounting structure. In some embodiments, the alignment process(es) may be performed manually by personnel at the installation site that control each of the motors during alignment. In other embodiments, the alignment process(es) may be automatically performed by sensors and motor controls such that motor movement is controlled by computerized analysis of sensor data and/or image data. A variety of sensor technologies may be employed by a mobile transport, such as LiDAR, camera sensors, radar sensors, and other sensor technologies known to one of skill in the art. Furthermore, active and passive sensor systems may also be deployed.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A mobile transport, the mobile transport comprising:
a base vehicle operable to move the mobile transport to a point of installation;
a rack configured to stack multiple solar tables, the rack comprises a pair of support beams and one or more pairs of cantilevered beams that are stacked vertically, each pair of cantilevered beams is designated to support one of the multiple solar tables, each solar table comprises a torque tube and one or more solar panels attached to the torque tube;
a set of holding arms attached to the base vehicle, the holding arms are extendable and are configured to engage the support beams from underneath to lift the rack for transportation.

2. The mobile transport of claim 1 wherein each cantilevered beam has one of:
a tube hook that is rotatable to lock a torque tube of a corresponding solar table;
a C-clamp that is able to be tightened or compressed to firmly hold the torque tube of the corresponding solar table; and
a wedge clamp to securely hold of a torque tube of a corresponding solar table with gravity.

3. The mobile transport of claim 1 wherein each cantilevered beam has two anti-rotational wings placed on both sides of a torque tube of a corresponding solar table to provide stable and secure support for the corresponding solar table during transportation.

4. The mobile transport of claim 1 wherein the rack comprises multiple rack legs that are foldable sideward or upward such that the rack is stackable.

5. The mobile transport of claim 1 wherein the one or more pairs of cantilevered beams are swingable beams that are swingable wideway such that each one of the multiple solar tables is fetchable directly from underneath without involving sideshift.

6. The mobile transport of claim 1 wherein the rack further comprises a pair of forklift receiving sleeves for receiving forks from a forklift.

7. The mobile transport of claim 6 wherein the rack further comprises one or more reinforcement beams for structural reinforcement to the support beams and the cantilevered beams.

8. The mobile transport of claim 1 further comprising:
a pair of solar table alignment and support (STAS) components attached to the base vehicle, the pair of STAS components fetch a solar table among the multiple solar tables and provide horizontal, vertical and/or angular motion to facilitate an installation of the fetched solar table.

9. The mobile transport of claim 8 wherein the pair of STAS components are placed on both ends of the base vehicle.

10. The mobile transport of claim 8 wherein each STAS component comprises a vertical motion element enabling vertical motion and a sideshift element enabling horizontal motion, the sideshift element is coupled to a solar tube of the fetched solar table.

11. A method for transporting multiple solar tables for installation, the method comprising:

stacking multiple solar tables on a rack, each solar table comprises a torque tube and one or more solar panels attached to the torque tube, the rack comprises a pair of support beams and one or more pairs of cantilevered beams that are stacked vertically, each pair of cantilevered beams is designated to support one of the multiple solar tables;

loading the rack onto a mobile transport for transportation to a point of installation, the mobile transport comprises a base vehicle and a set of holding arms that are extendable, the holding arms are configured to engage the support beams from underneath to lift the rack for transportation; and fetching a solar table among the multiple solar tables from the rack for installation.

12. The method of claim 11 wherein each cantilevered beam has one of:

a tube hook that is rotatable to lock a torque tube of a corresponding solar table;

a C-clamp that is able to be tightened or compressed to firmly hold the torque tube of the corresponding solar table; and a wedge clamp to securely hold of a torque tube of a corresponding solar table with gravity.

13. The method of claim 11 wherein each cantilevered beam has two anti-rotational wings placed on both sides of a torque tube of a corresponding solar table to provide a stable and secure support for the corresponding solar table during transportation.

14. The method of claim 11 wherein the solar table is fetched after the rack is unloaded to ground from the mobile transport or fetched directly from the mobile transport vehicle.

15. The method of claim 14 wherein the solar table is fetched by a second mobile transport from the rack after the rack is unloaded to ground.

16. The method of claim 14 wherein the solar table is fetched by the mobile transport itself using a pair of solar table alignment and support (STAS) components placed on both ends of the base vehicle, each STAS component comprises a vertical motion element enabling vertical motion and a sideshift element enabling horizontal motion.

17. The method of claim 11 wherein the one or more pairs of cantilevered beams are swingable beams that are swingable wideway such that each one of the multiple solar tables is fetchable directly from underneath without involving sideshift.

18. The method of claim 11 wherein the fetched solar table is a bottom solar table among the multiple solar tables.

19. The method of claim 11 further comprises:

installing the fetched solar table at the point of installation.

20. The method of claim 19 wherein the installing the fetched solar table is implemented by a second mobile transport or the mobile transport itself.

* * * * *